(12) United States Patent
Butterworth et al.

(10) Patent No.: US 8,259,067 B2
(45) Date of Patent: Sep. 4, 2012

(54) APPARATUS FOR CAPTURING AND ANALYZING LIGHT AND METHOD EMBODIED THEREIN

(75) Inventors: Mark M. Butterworth, Santa Clara, CA (US); Mike J. Brosnan, Fremont, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 857 days.

(21) Appl. No.: 12/180,487

(22) Filed: Jul. 25, 2008

(65) Prior Publication Data

US 2008/0278449 A1 Nov. 13, 2008

Related U.S. Application Data

(62) Division of application No. 10/853,866, filed on May 25, 2004, now Pat. No. 7,420,542.

(51) Int. Cl.
*G06F 3/033* (2006.01)
(52) U.S. Cl. .......................... 345/166; 345/163; 345/157
(58) Field of Classification Search .................. 345/163, 345/164, 165, 166; 348/229.1, 376
See application file for complete search history.

(56) References Cited

U.S. PATENT DOCUMENTS

| | | | |
|---|---|---|---|
| 5,274,361 A * | 12/1993 | Snow | 345/166 |
| 5,424,838 A | 6/1995 | Siu | |
| 5,517,211 A | 5/1996 | Kwang-Chien | |
| 5,786,804 A | 7/1998 | Gordon | |
| 6,424,407 B1 * | 7/2002 | Kinrot et al. | 356/28 |
| 6,697,052 B2 | 2/2004 | Shen et al. | |
| 7,068,257 B1 | 6/2006 | Bohn et al. | |
| 2004/0056966 A1 * | 3/2004 | Schechner et al. | 348/229.1 |
| 2004/0095322 A1 * | 5/2004 | Sun et al. | 345/165 |

OTHER PUBLICATIONS

Williams, Harold "Polarization Sundials", Montgomery College Planetarium; http://montgomerycollege.edu/Departments/planet, as presented on Saturday, Nov. 8, 2003 at Tidwater Community College in Virginia Beach, Virginia, as found on http://www.archive.org dated Dec. 8, 2003.

* cited by examiner

*Primary Examiner* — Quan-Zhen Wang
*Assistant Examiner* — Troy Dalrymple

(57) ABSTRACT

An apparatus including an image sensor is disclosed. The apparatus includes a polarization filter, an image sensor, and a processor connected to the image sensor. The polarization filter is adapted to filter out light polarized in a first direction from a first scene. The image sensor is adapted to capture the filtered light, and the image sensor includes support circuits to convert the captured filtered light to image data. The processor is adapted to process the image data to detect features of the first scene. The polarization filter filters out noise component of the image, thus increasing contrast. In another embodiment, a mosaic polarization filter is used to capture a scene in a first image including light from the scene having first polarity and to capture the scene in a second image including light from the scene having first polarity. The two images can be analyzed to determine various characteristics of the scene.

5 Claims, 3 Drawing Sheets

APPARATUS FOR CAPTURING AND ANALYZING LIGHT AND METHOD EMBODIED THEREIN

CROSS-REFERENCE TO RELATED APPLICATIONS

This is a divisional of application Ser. No. 10/853,866, filed on May 25, 2004, issued as U.S. Pat. No. 7,420,542, the entire disclosure of which is incorporated into this application by reference.

BACKGROUND

The present invention relates to imaging devices, and more particularly, to a computer mouse or a digital camera for capturing and analyzing images.

Many devices capture images as digitized electronic signals (representing the captured image) and analyze the digitized electronic signals ("image data") for various purposes. For example, quality control inspection systems capture images of parts under inspection and analyzes the image data to identify various features of the images data such as the size of the parts and imperfections, if any. Another example is an optical computer mouse which captures a sequence of images for analyzing. The optical computer mouse, to determine navigation or movement information, analyzes the image data from each captured image to identify various features within the captured image, then compares the relative location of the identified features between different images to determine the movement information.

A first type of the optical computer mouse typically operates on a relatively smooth surface (to facilitate easy gliding movement), the operating surface having relatively small features. For convenience, this type of optical computer mouse is referred to as a 2D optical computer mouse. For example, a 2D optical computer mouse may operate on a piece of blank paper. To determine movement information, the 2D optical computer mouse needs to capture and identify the small features (for example, paper fiber) of the surface on which it is operating. To assist in capturing these small features, the 2D optical computer mouse commonly includes a light source such as an LED (light emitting diode) shining light (incident light) on an imaging area (of the underlying surface) under the optical computer mouse.

The light from the LED is introduced at a grazing angle to cast shadows on small features of the imaging area under the 2D optical computer mouse (thus imaging a portion of the underlying surface) and to reflect off of the imaging area. The reflected light is captured by an image sensor within the 2D optical computer mouse and converted to image data (including the light and shadow areas). The image data is analyzed by a processor which is configured to detect features of the image data. During the analysis, background data are often referred to as the noise (N) and the detected feature data are often referred to as the signal (S). A high signal-to-noise (S/N)-ratio is preferred because it is easier to detect features hence require less hardware and software resources.

A second type of the optical computer mouse typically operates as a 3D mouse and is held and freely waved about. The 3D optical computer mouse captures a sequence of random or unpredictable images and processes image data from the captured images to provide navigation or movement information. During its movement, the 3D optical computer mouse captures a sequence of images that it is exposed to, for example, a wall or other scenes, indoor or outdoor. For such a device, depending on the environment to which it is exposed, the captured images may be faint with minimal distinguishable features with which the movement information can be determined. That is, depending on the images to which 3D optical computer mouse is exposed, the S/N ratio can be lower than desired.

For both types of the optical computer mouse, it can be difficult to capture small features, distinguish faint features, or both due to relatively low S/N ratio. To increase the S/N ratio, brighter incident light, more sensitive image sensors, or both can be used; however, these components increase cost and operating expenses as well as to decrease reliability.

Accordingly, there remains a need for an improved method and apparatus for capturing images to improve the S/N ratio of captured images.

SUMMARY

The need is met by the present invention. In a first embodiment of the present invention, an apparatus includes a polarization filter, an image sensor, and a processor connected to the image sensor. The polarization filter is adapted to filter out light polarized in a first direction from a first scene. The image sensor is adapted to capture the filtered light, and the image sensor includes support circuits to convert the captured filtered light to image data. The processor is adapted to process the image data to detect features of the first scene.

In a second embodiment of the present invention, an apparatus includes a mosaic polarization filter, an image sensor, and a processor. The mosaic polarization filter is adapted to filter light from a scene and has a first portion polarized in a first direction and a second portion polarized in a second direction. The image sensor includes an array of pixels, each pixel having a photo detector, and where a first set of pixels captures light filtered by the first portion of the mosaic polarization filter and a second set of pixels captures light filtered by the second portion of the mosaic polarization filter. The image sensor further includes circuits to convert the captured light to image data. The processor is adapted to process the image data.

In a third embodiment of the present invention, a method of analyzing image data is disclosed. First polarized light from a scene (illuminated by the incident light) is captured, and the captured scene is converted into first image data, the incident light having polarized components. Second polarized light from the scene is captured and the captured scene is converted into second image data. Then, polarization strength and angle at each region of the scene is determined. Finally, direction of the incident light is determined.

Other aspects and advantages of the present invention will become apparent from the following detailed description, taken in conjunction with the accompanying drawings, illustrating by way of example the principles of the invention.

DETAILED DESCRIPTION

The present invention will now be described with reference to FIGS. 1 through 2C which illustrate various embodiments of the present invention. In the Figures, some sizes of structures or portions may be exaggerated relative to sizes of other structures or portions for illustrative purposes and, thus, are provided to illustrate the general structures of the present invention. Furthermore, various aspects of the present invention are described with reference to a structure or a portion positioned "on" or "over" relative to other structures, portions, or both. As will be appreciated by those of skill in the art, relative terms and phrases such as "on" or "over" are used herein to describe one structure's or portion's relationship to another structure or portion as illustrated in the Figures. It will be understood that such relative terms are intended to encompass different orientations of the device in addition to the orientation depicted in the Figures. For example, if the device in the Figures is turned, rotated, or both, the structure or the portion described as "on" or "over" other structures or portions would now be oriented "below," "under," "left of," "right of," "in front of," or "behind" the other structures or portions.

As shown in the Figures for the purposes of illustration, embodiments of the present invention are exemplified by an apparatus such as an optical computer mouse having an image sensor and a polarization filter in front of the image sensor. The polarization filter is adapted to filter light from a first scene whereby contrast of features within the first scene is higher relative to contrast of features within the first scene within unfiltered light from the first scene. Here, the scene can be, for example, an area of an underlying surface where the optical computer mouse is exposed to. The image sensor is adapted to capture the filtered light. The image sensor often includes circuits such as analog-to-digital converters to convert the captured filtered light to image data. A processor connected to the image sensor is programmed to process the image data to detect features of the first scene.

The signal component of the scene is the feature of the scene and the noise component of the scene is all other light. Here, the polarized filter blocks the noise component from the light from the scene resulting in a higher signal-to-noise (S/N) ratio.

Figure 1A:
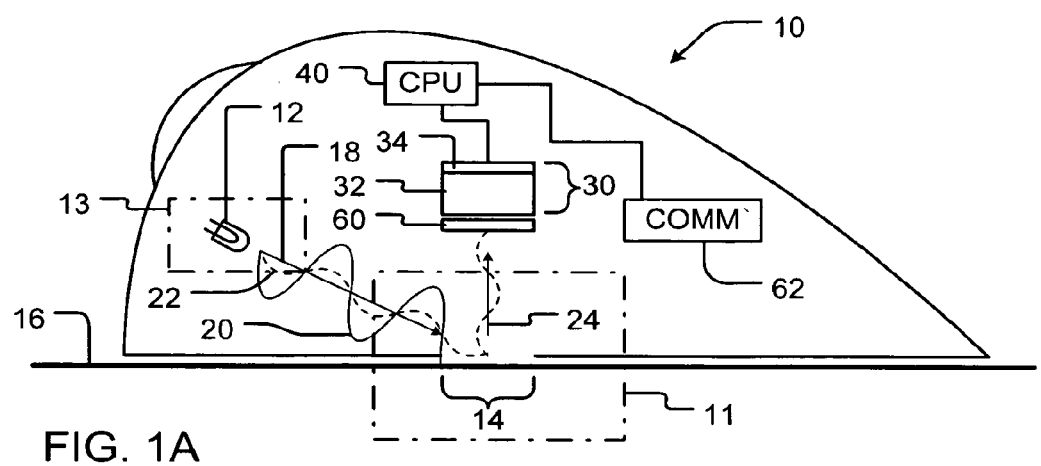
FIG. 1A is a simplified schematic illustration of an apparatus in accordance with one embodiment of the present invention.

FIG. 1A is a simplified schematic illustration of an apparatus 10 such as a computer mouse 10 in accordance with one embodiment of the present invention. The apparatus 10 includes a light source 12 adapted to provide light to illuminate an imaging area 14 which can be a portion of an underlying surface 16. The light 18 from the light source 12 is referred to as the incident light 18. In the Figures, for convenience, the incident light 18 is represented by a ray line 18 illustrating the general direction of the incident light 18. The incident light ray 18 and other ray lines in the Figures are used to illustrate general direction of light and do not represent ray traces often used in the art of optics. The incident light 18 has s-polarized components (s-polarized light 22, polarized in a "first direction") and p-polarized components (p-polarized light 20, polarized in a "second direction" normal, that is perpendicular, to the first direction). The light source can be, for example, a light emitting diode (LED) or laser.

The p-polarized light component 20 is polarized normal (perpendicular) relative to the plane of the underlying surface 16 while the s-polarized light component 22 is polarized co-planar (parallel) relative to the plane of the underlying surface 16. For clarity, in the Figures, the s-polarized light component 22 is illustrated using short-dashed lines. A first portion 11 of FIG. 1A is illustrated in more detail by FIG. 1B.

Figure 1B:
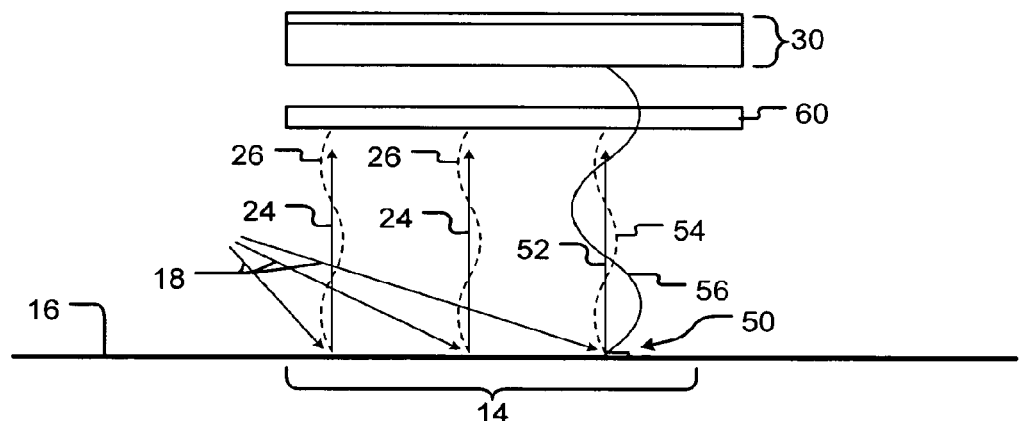
FIG. 1B is more detailed view of a portion of the apparatus of FIG. 1A.

Referring to FIGS. 1A and 1B, the incident light 18 impinges on the imaging area 14 and reflects off of the imaging area 14. At the imaging area 14 the p-polarized light 20 is mostly absorbed by the underlying surface 16 mainly due to its normal angle of polarization relative to the surface 16. In contrast, the s-polarized light 22 is mostly reflected off of the imaging area 14, again, mainly due to its normal angle of polarization relative to the surface 16.

Accordingly, reflected light 24 comprises mostly reflected s-polarized light 26. The reflected light 24 is captured by an image sensor 30 adapted to capture light from a scene such as the imaging area 24. The image sensor 30 includes photo detector circuits such as photo detector diodes 32 and also includes support circuit 34 such as analog-to-digital converter to convert the captured image to image data. A processor 40 is connected to the image sensor 30. The processor 40 can be programmed to, or adapted to, process or analyze the image data from the image sensor 30 to detect features of the image from the imaging area 14. The imaging area 14, in the illustrated embodiment, provides a scene from which the image sensor 30 captures an image and, accordingly, is also referred to as a scene 14, or a first scene 14. The image sensor 30 can be, for example, a CMOS image array known in the industry and available in the market.

When the incident light 18 encounters a feature 50 (such as a small bump or fiber) of the surface 16, the incident light 18 reflects off from and is scattered by the feature 50. The reflected scattered light 52 includes s-polarized light component 54 and p-polarized light component 56. Here, most of the reflected light 24 and 52 comprises s-polarized light 26 and 54. This is the background light signal and represents the noise component of the signal-to-noise (S/N) ratio. The p-polarized light 56 portion of the reflected scattered light 52 represents the signal component of the S/N ratio. To increase the signal-to-noise (S/N) ratio, the noise component (that is, the s-polarized light 26 and 54 component) is filtered out by a polarization filter 60 adapted to filter out the reflected s-polarized light 26 and 54, polarized in the first direction, thereby greatly reducing, or even eliminating the noise component from reaching the image sensor 30.

The reduction of the noise (N) component reaching the image sensor 30 essentially increases the contrast of the reflect light 52 from the feature 50 (signal (S) component) compared to reflected light 24 from other parts of the underlying surface 16. The result is increased signal-to-noise (S/N) ratio and thus easier and better detection of the features of the underlying surface 16.

To further reduce the s-polarized light (the noise component) reaching the image sensor 30, the light source 12 can be a laser that provides light polarized in the second direction (for example, p-polarized light).

Figure 1C:
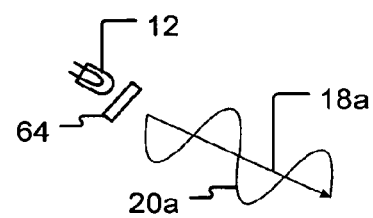
FIG. 1C is an alternative embodiment of a portion of the apparatus of FIG. 1A.

An alternative embodiment of a second portion 13 of the apparatus 10 is illustrated in FIG. 1C where incident light from the light source 12 is filtered by an incident light polarization filter 64 adapted to filter out light polarized in the first direction (s-polarized light) so that filtered incident light 18a reaching the imaging area 14 only includes light polarized in the second direction (p-polarized light) 20a.

Referring again to FIG. 1A, the apparatus 10 further includes a wireless communications module 62 including an antenna (not shown) to communicate with a host computer (not shown) or other electronic devices.

The processor 40 is further adapted to process a second image data of a second scene to detect features of the second scene, and to compare the features of the second scene to the features of the first image data to determine movement of the apparatus 10. That is, in the present example, the apparatus 10 is a computer mouse 10 that is moved across the underlying surface 16. As the mouse 10 is moved, the image sensor 30 captures a first image data at a first instance in time and a second image data at a second instance in time with the mouse 10 moving between the two instances of time. The feature 50 is in a relatively different position within the second image data compared to the position of the feature 50 within the first image data. The difference in the relative position of the feature 50 is used to determine the movement of the computer mouse 10.

For the apparatus 10, the image sensor 30 and the polarization filter 60 are illustrated for clarity as separate components; however, the polarization filter 60 can be fabricated on, attached to, or as a part of the image sensor 30. Similarly, the incident light polarization filter 64 can be manufactured attached to or as a part of the light source 12.

Figure 2A:
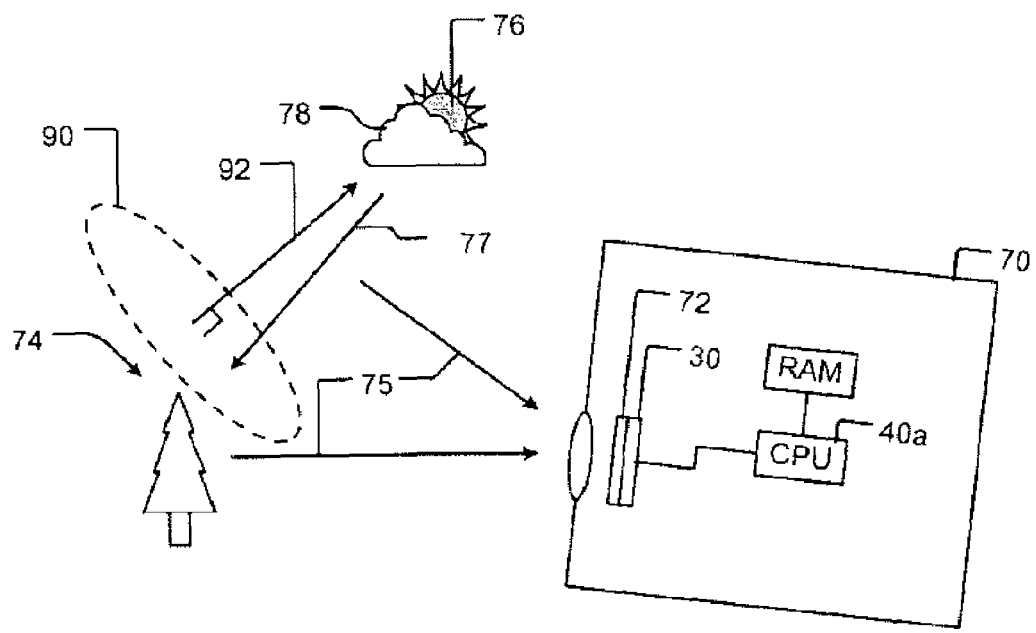
FIG. 2A is a simplified schematic illustration of an apparatus in accordance with another embodiment of the present invention.
Figure 2B:
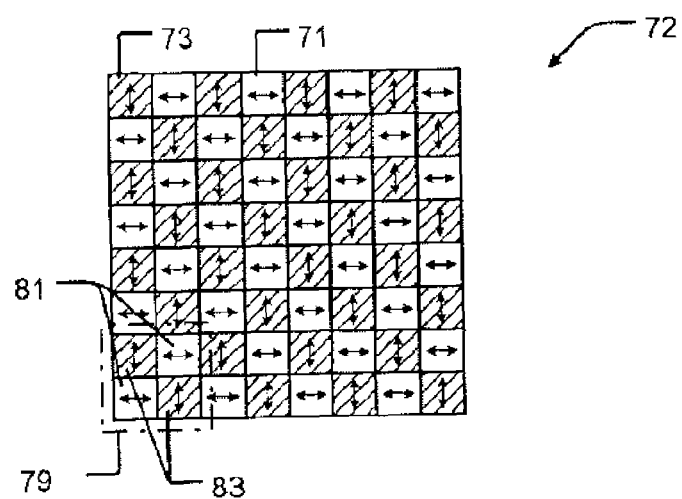
FIG. 2B is more detailed view of a portion of the apparatus of FIG. 2A.

The present technique of using polarization filter to increase contrast of image data from a scene can be implemented for a variety of applications. For example, FIG. 2A illustrates an apparatus 70 having an image sensor for capturing images from a scene. FIG. 2B illustrates a portion of the apparatus 70 in more detail. The apparatus 70 of FIG. 2 includes portions or components similar to the apparatus 10 of FIG. 1A. For convenience, portions or components of the apparatus 70 which are similar to corresponding portions or components of the apparatus 10 are assigned the same reference numerals; similar but changed portions or components are assigned the same reference numerals followed by letter "a"; and different portions or components are assigned different reference numerals.

Referring to FIGS. 2A and 2B, the apparatus 70 includes a mosaic polarization filter 72 adapted to filter light 75 from a scene 74 and its background such as the sky. The light 75 from the scene 74 and its background is referred to, for convenience, as reflected light 75. The mosaic polarization filter 72 includes a checkerboard pattern of alternating filters with a first set 71 of filters (or, first portion, illustrated without shading in FIG. 2B) polarized in a first direction (s-polarization, horizontal direction) and a second set 73 of filters (or, second portion, illustrated as shaded portions in FIG. 2B) polarized in a second direction (p-polarization, vertical direction) as illustrated in FIG. 2B. The apparatus 70 can be any apparatus that includes image capture function, for example, digital camera, navigation equipment, or 3D or computer mouse. To avoid clutter, in FIG. 2B, only one individual filter from the first set of filters 71 and only one individual filter from the second set of filters 73 are thus designated with reference numbers. Further, in FIG. 2B, the polarization direction of each of the individual filters are indicated with horizontal or vertical rays.

The mosaic polarization filter 72 is illustrated, for simplicity, as a checkerboard pattern having eight by eight individual filters; however, in actual implementation, the number of individual filters in the mosaic polarization filter 72 may vary and likely to be much higher. Each individual filter is associated with a set of pixels of the image sensor 30, each pixel having a photo detector. Each set of pixels include at least one photo detector, and the set of pixels captures light filtered by one of the individual filters. That is, a first set of pixels captures light filtered by the first portion 71 of the mosaic polarization filter 72 and a second set of pixels captures light filtered by the second portion 73 of the mosaic polarization filter 72. As before, the image sensor 30 includes circuits (not show in FIG. 2A but illustrated in FIG. 1A as support circuit 34 such as analog-to-digital converter 34) to convert the reflected light 75 from the scene 74 to image data and a processor 40a adapted to process the image data.

The processor 40a is adapted or programmed to determine strength or intensity of light captured via the first set 71 of filters and strength or intensity of light captured via the second set 73 of filters in absolute values, in relative numbers to each other, or both. Many properties of the image data (first images data) captured by the pixels related to the first set 71 of filters and the image data (second images data) captured by the pixels related to the second set 73 of filters can be analyzed such as their absolute and relative strengths, intensities, contrast with each of the images, and the signal-to-noise (S/N) ratio. For example, light intensities of the first image data can be summed to determine the strength of the first image data, and likewise for the second image data. Further, the relative intensity measurements can be used to determine dominant polarity of the reflected light 75 from the scene 74.

For example, contrasts of the first image data can be determined by comparing various high data values and low data values within the first image data, especially for pixels close to each other, and likewise for the second image data. This is because light, when reflected from different objects of the scene, tends to polarize depending on the type of the objects of the scene. For instance, dielectric materials such as, for example only, rubber or plastics, tends to reflect light in a way such that the reflected light is polarized in a particular direction.

In an application where the apparatus is a 3D mouse, depending on the environment to which it is exposed, the scene to which it is exposed may provide only faint images with minimal distinguishable features with which the movement information can be determined.

That is, depending on the images to which 3D optical computer mouse 70 is exposed, the S/N ratio can be lower than desired.

For a higher contrast image, the processor 40a can be programmed to select the first images data (provided by the pixels related to the first set 71 of filters) or the second images data (captured by the pixels related to the second set 73 of filters), whichever has a higher contrast.

Moreover, the processor 40a can be programmed, or adapted, to determine direction of the source 76 of the incident light 77 to the scene 74. For example, if the scene 74 is an outdoor scene, and the Sun 76 is providing the incident light 77 to the scene, even if the incident light 77 is through a cloud 78, the processor 40a can be programmed to determine the direction of the Sun 76, or the light source 76.

For convenience of discussion of the present invention, the CMOS image sensor 30 includes an array 30 of eight by eight pixels of photo diodes for a total of 64 diodes that convert light into electronic signals. Over each pixel is one of the filters 71, 73 of the mosaic polarization filter 72. The reflected light 75 from the scene 74 includes source 76 incident light 77 reflected from the scene 74 as well as light from open sky.

Continuing to refer to FIGS. 2A and 2B, as already discussed, the first image data, representing the first polarized component of the reflected light 75 is captured. Here, the incident light 77 can have, as its source, as the Sun 76 and has polarized components. The first image data includes the first polarized light from the scene 74 because reflected light 75 is filtered by the first set 71 of filters of the mosaic polarization filter 72. Likewise, the second image data, representing the second polarized component of the reflected light 75 is captured via the second set 73 of filters of the mosaic polarization filter 72. In the present example, the first image data includes 32 pixels, each pixel having a grey scale value ranging from zero to 255 and the second image data includes 32 pixels, each pixel having a grey scale value ranging from zero to 255. The value of the pixel represents the amount or intensity of light received by the pixel.

The eight by eight filter array can be organized into regions, each region including a number of individual filters. Each region represents a region of the scene 74 captured by the first image data and the second image data. For example, a region 79 can be a two by two filter areas including two first set filters 81 from the first set 71 and two second set filters 83 from the second set 73. For each region, polarization strength and the angle of polarization can be determined. Polarization angle and the strength of polarization of the reflected light 75 for region 79 can be determined as follows:

To determine the polarization angle, the pixel values related to the first set filters 81 are averaged and the pixel values related to the second set filters 83 are averaged. Then, the polarization angle of the light at region 79 is arctangent of the ratio of the two averages. To determine the polarization strength, the horizontal component (values of pixels related to the first set filters 81) and the vertical component (values of pixels related to the second set filters 83) are combined as a square root of the sum of the horizontal component squared and the vertical component. For each region, the polarization angle and the polarization strength are combined to form a polarization vector.

When these operations are repeated for each of the regions of the mosaic polarization filter 72, a vector array results. In the present example, the resultant vector array is illustrated in FIG. 2C as a four by four array 86 of regions. In actual implementation, the number of regions of the vector array would be much larger. The following listing includes a computer program for determining the polarization vectors for a sample image data:

% get vertical and horizontal gray scale images
  vertical_gray_scale=imread('vertical_gray_scale.jpg'));
horizontal_gray_scale=imread('horizontal_gray_scale-
  .jpg'));
% make images square
image_dimensions=min(size(vertical_gray_scale),size
  (horizontal_gray_scale));
d=image_dimensions;
horizontal_gray_scale_horizontal_gray_scale(1:d(1),1:d(2),
  1:d(3));
vertical_gray_scale=vertical_gray_scale(1:d(1),1:d(2),1:d
  (3));
% calculate polarization strength and angle at each pixel
polarization_angle=atan2(double(horizontal_gray_scale),
  double(vertical_gray_scale));
temporary=min(double(horizontal_gray_scale)./max(1e−9,
  double(vertical_gray_scale)),
  double(vertical_gray_scale)./max(1e−9,double(horizontal-
  _gray_scale)));
polarization_strength=1-temporary;
% display results
subplot (2,2,1);
imshow(horizontal_qray_scale,[ ],'notruesize');
title('horiz');
colorbar;
subplot (2,2,2);
imshow(vertical_gray_scale,[ ],'notruesize');
title('vertical');
colorbar;
subplot(2,2,3);
imshow(180/pi*polarization_angle(:,:,1),[ ],'notruesize');
title('polarization angle');
colorbar;
subplot(2,2,4);
imshow(polarization_strength(:,:,1),[ ],'notruesize');
title('polarization strength');
colorbar;
print-djpeg90-r120 polariz.jpg In the above computer program listing, comment lines are proceeded by a percent sign and the variables have the following definitions:

| Variable | Definition |
| --- | --- |
| vertical_gray_scale.jpg | An image data file with vertically polarized light. |
| horizontal_gray_scale.jpg | An image data file with horizontally polarized light. |
| vertical_gray_scale | vertically scaled sub-image |
| horizontal_gray_scale | horizontally scaled sub-image |
| image_dimensions | size of the scaled image |
| polarization_angle | polarization angle of entire sub-image |
| temporary | temporary variable |
| polarization_strength | polarization strength of entire sub-image |
| polariz.jpg | image data including vector array of polarization angles and strength |

Figure 2C:
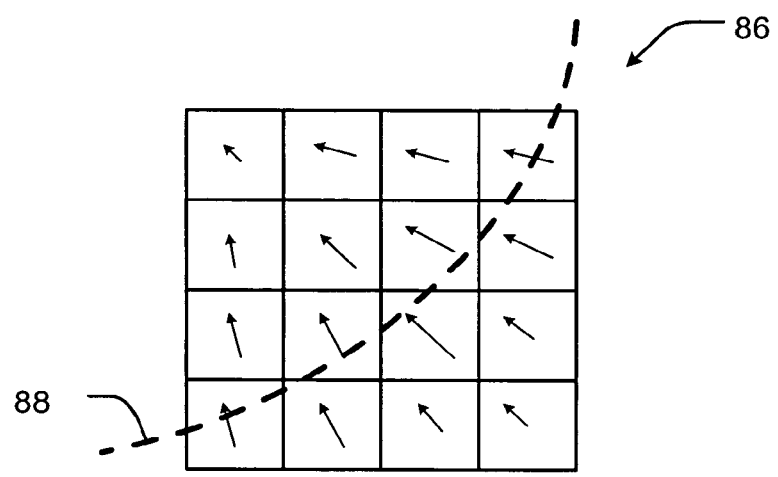
FIG. 2C is a sample illustration of a vector array in accordance with one embodiment of the present invention.

Referring to FIGS. 2A through 2C, each region of the vector array 86 includes a vector having polarization strength and polarization angle. The vector of the regions are illustrated in the drawings as rays within each region.

To determine the direction of the incident light 77, the vector array 86 is examined to identify the polarization directions. Assuming that the incident light source 76 includes polarized components, the polarization directions of the vectors are discernable. Further, vectors having greatest values (relative to other vectors of the vector array 86) are used to determine an polarization arc 88 which is a portion of an polarization circle 90 formed by the rays of the Sun 76, the incident light 77, in the present example, the circle 90 defining a plane and having a center. The Sun 76 is located in a direction 92 normal to the plane defined by the circle 90 along a line intersecting its center.

For the purposes of determining direction of the incident light 77, the first image data and the second image data can be captured simultaneously as illustrated in FIGS. 2A and 2B. In an alternative embodiment, the first image data and the second image data can be captured sequentially where the first image data is captured first and the second image data is captured soon thereafter, the second image data capturing the same scene as the first image data. This is more suitable to an imaging apparatus (not illustrated in the Figures) having an image senor with a single polarity polarization filter (rather than the mosaic polarization filter 72).

The single polarity polarization filter (not illustrated) can be configured to cover the entire image sensor in the first direction to allow the image sensor to capture the first image data and rotated to cover the entire image sensor in the second direction to allow the image sensor to capture the first image data.

In another alternative embodiment, an imaging apparatus (not illustrated in the Figures) can include two image sensors the first image sensor having a first single polarization lens filtering light polarized in the first direction and adapted to capture images for first image data, and the second image sensor having a second single polarization lens filtering light polarized in the second direction and adapted to capture images for second image data.

From the foregoing, it will be apparent that the present invention is novel and offers advantages over the current art. Although specific embodiments of the invention are described and illustrated above, the invention is not to be limited to the specific forms or arrangements of parts so described and illustrated. For example, differing configurations, sizes, or materials may be used but still fall within the scope of the present invention. The invention is limited by the claims that follow.

What is claimed is:

1. An apparatus comprising:
   a housing of a computer mouse:
   a light source located within the housing, the light source being adapted to provide incident light to a surface, said light source being configured to provide only p-polarized light as said incident light;
   a polarization filter located within the housing to receive reflected light of the incident light reflected from the surface, the polarization filter being adapted to filter out s-polarized light of the reflected light, wherein the polarization filter is located within the housing such that said incident light from the light source does not travel through the polarization filter to reach the surface;
   an image sensor located within the housing, the image sensor being adapted to capture the filtered light, said image sensor including support circuits to convert the captured filtered light to image data; and
   a processor connected to said image sensor, said processor adapted to process the image data to detect features of the surface.

2. The apparatus recited in claim 1, wherein the light source includes an incident light polarization filter, the incident light polarization filter being adapted to filter out any s-polarization light to provide the p-polarized light as said incident light.

3. The apparatus recited in claim 1 wherein said light source is a light emitting diode (LED).

4. The apparatus recited in claim 1 further comprising means for wireless communication with a computer.

5. The apparatus recited in claim 1 wherein said processor is adapted to process a second image data of the surface to detect second features of the surface, and to compare the second features of the surface to the features of the surface to determine movement of the apparatus.

* * * * *